United States Patent [19]

Bollmer

[11] 4,090,302

[45] May 23, 1978

[54] PRINTING BLANKET HOLDING BAR GAGE

[75] Inventor: Jacob A. Bollmer, Dayton, Ohio

[73] Assignee: Dayco Corporation, Dayton, Ohio

[21] Appl. No.: 778,768

[22] Filed: Mar. 17, 1977

[51] Int. Cl.² .............................................. G01B 3/30
[52] U.S. Cl. .................................................. 33/168 B
[58] Field of Search ................. 33/168, 174 H, 169 B,
33/169 R, 185 R, 162, 107 R

[56] References Cited

U.S. PATENT DOCUMENTS

| 743,076 | 11/1903 | Harris | 33/168 R |
|---|---|---|---|
| 1,393,009 | 10/1921 | Carroll | 33/168 R |
| 1,860,174 | 5/1932 | Cronk | 33/168 R |

FOREIGN PATENT DOCUMENTS

| 227,381 | 1/1925 | United Kingdom | 33/168 R |
| 349,357 | 5/1931 | United Kingdom | 33/168 R |

Primary Examiner—Richard E. Aegerter
Assistant Examiner—John W. Shepperd
Attorney, Agent, or Firm—Reuben Wolk

[57] ABSTRACT

A printing blanket holding bar gage is provided and made of a flat strip having a stepped slot therein which extends inwardly from an edge thereof for receipt of a holding bar and the slot is comprised of a plurality of aligned slot portions each defined by an associated spaced pair of parallel edges having a particular perpendicular distance therebetween with the perpendicular distance between each associated spaced pair of parallel edges being less in each consecutive slot portion disposed inwardly from the edge enabling the gage to be moved into gaging relation with a holding bar and serve as a go no-go gage therefor; and, such gage also has comparators thereon for approximately the thickness of a leg of an associated holding bar brought into gaging association therewith.

8 Claims, 6 Drawing Figures

PRINTING BLANKET HOLDING BAR GAGE

BACKGROUND OF THE INVENTION

Printing presses employed in lithographic printing are widely used and employ so-called printing blankets which are fastened around the periphery of an associated printing cylinder for the purpose of picking up an ink design or image deposited thereon by an inking roller and such design or image is transferred onto an article being printed. A commonly used technique for holding a printing blanket in position on an associated printing cylinder is to employ printing blanket holding bars which are fastened to opposite ends of the blanket. However, during the process of printing the holding bars and their associated blanket wear and/or are often damaged whereby they must be replaced.

Printing blanket stock for a particular press is often provided on an associated supply roll thereof whereby the size thereof is known; however, the holding bars must be measured to assure that replacement bars will function in the printing press. It would be a simple matter to measure the holding bars if the printing blankets with worn or damaged holding bars attached were to be removed from the press and taken to a measuring station or laboratory for measurement employing the usual measuring instruments. However, often times such procedure is too time consuming and it is preferred that decisions regarding replacement holding bars be made at the press.

SUMMARY

It is a feature of this invention to provide a printing blanket holding bar gage which is readily usable at the printing press site to measure a printing blanket holding bar.

Another feature of this invention is to provide a gage of the character mentioned which is usable to provide certain measurements of such a holding bar with the bar completely installed or partially installed on an associated printing cylinder.

Another feature of this invention is to provide a gage of the character mentioned which is of optimum simplicity and which may be in the form of an expandable gage.

Another feature of this invention is to provide a printing blanket holding bar gage made of a flat strip having a stepped slot therein which extends inwardly from an edge thereof for receipt of a holding bar and the slot is comprised of a plurality of aligned slot portions each defined by an associated spaced pair of parallel edges having a particular perpendicular distance therebetween with the perpendicular distance between each associated spaced pair of parallel edges being less in each consecutive slot portion disposed inwardly from the said edge enabling the gage to be moved into gaging relation with a holding bar and serve as a go no-go gage therefor; and, such gage also has comparators thereon for approximating the thickness of a leg of an associated holding bar brought into gaging association therewith.

Accordingly, it is an object of this invention to provide a printing blanket holding bar gage having one or more of the novel features set forth above or hereinafter shown or described.

Other details, features, objects, uses, and advantages of this invention will become apparent from the embodiments thereof presented in the accompanying specification, claims, and drawing.

BRIEF DESCRIPTION OF THE DRAWING

The accompanying drawing shows a present preferred embodiment of this invention, in which.

DESCRIPTION OF ILLUSTRATED EMBODIMENT

Figure 1:
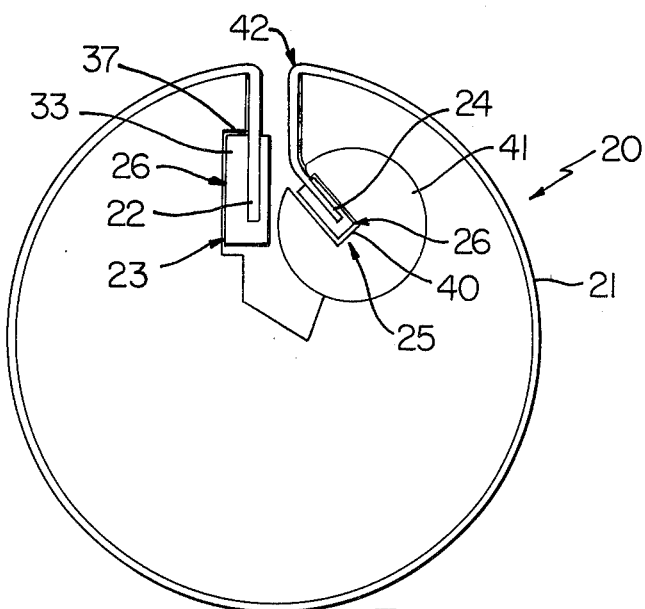
FIG. 1 is an end view of an exemplary printing cylinder having a printing blanket assembly comprised of a printing blanket provided with holding bars fixed to its opposite ends and with the assembly installed in position on such cylinder.

Reference is now made to FIG. 1 of the drawing which illustrates an exemplary printing press cylinder 20 which is particularly adapted to be installed in a printing press used in lithographic printing; and, such cylinder 20 has a printing blanket 21 disposed therearound and held in position as is well known in the art. In particular, the blanket 21 has a leading end portion 22 which is detachably fastened in position on the printing cylinder 20 as shown at 23 and blanket 21 has what would be referred to as a trailing end portion 24 which is also suitable detachably fastened in position on the printing cylinder 20 as shown at 25. Each end portion 22 and 24 has a blanket holding bar suitably fixed thereto and for simplicity each holding bar is designated by the same reference numeral 26.

Each holding bar 26 is in the form of an elongated holding bar of roughly U-shaped cross sectional outline having a bight 32 and a pair of legs 33 and 34 extending from opposite ends of the bight with the legs 33 and 34 defining a channel 35 for receiving an associated end portion of the printing blanket 21 therewithin whether it be the leading end portion 22 of the blanket 21 or the trailing end portion 24 of such blanket.

The cylinder 20 has what will be referred to as a retaining shelf 37 which is particularly adapted to receive the outer edge portion of the comparatively thick leg 33 thereagainst and any other suitable means may be employed in addition to the retaining shelf 37 to detachably fasten the holding bar 26 associated with the leading end portion 22 of the blanket 21 to the cylinder 20. The trailing end portion 24 of the blanket 21 is suitably detachably fastened within its holding bar 26 and such trailing end portion and its holding bar 26 are received within a recess 40 provided in a so-called reel rod or reel 41 of known construction which is suitably supported for rotation within the cylinder 20 in a manner which is well known in the art. The printing blanket 21 with its holding bars 26 will also be referred to as a blanket assembly 42.

Figure 3:
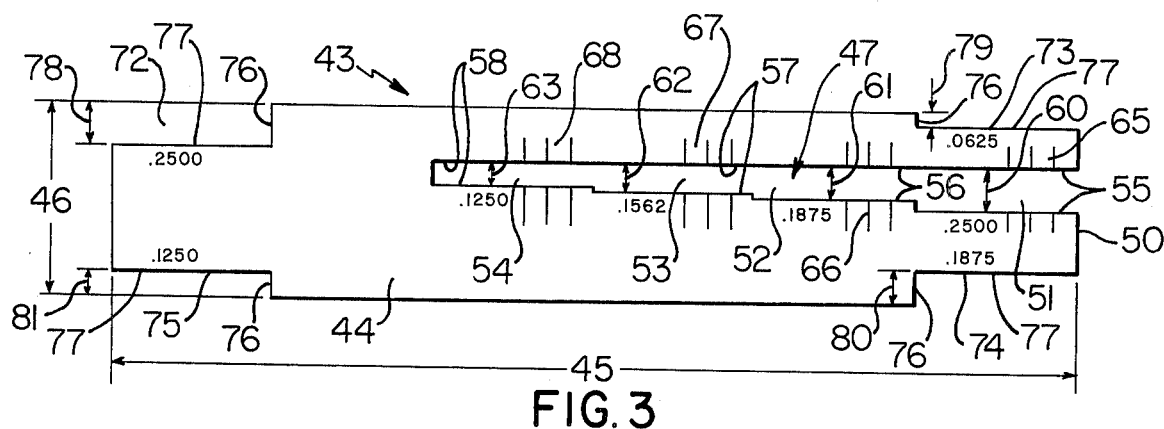
FIG. 3 is a plan view of the holding bar gage of this invention.

During normal usage of each assembly 42 it is necessary from time-to-time to replace the blanket 21 and its holding bars 26 whereby it is necessary to measure same. Preferably such measuring should be achieved with minimum effort and minimum press down time whereby this invention provides a simple, economical, and readily used gage which makes these goals possible and such gage is designated generally by the reference numeral 43 and illustrated in FIG. 3.

The gage 43 is in the form of a flat strip 44 preferably having a roughly rectangular peripheral outline which has a substantial length 45, a comparatively small width 46 which is of the order of a small fractional part of the length 45, and a thickness (not shown) which is a small fractional part of the width 46. For example, the thickness may be of the order of a small fractional part of an inch, such as a 1/16 of an inch, for example.

The strip 44 has a stepped elongate slot 47 defined therein from an end edge 50 thereof for receipt of an associated holding bar, such as a holding bar 26, which is to be measured therewithin. The slot 47 is comprised of a plurality of aligned slot portions and in this example, the slot 47 is comprised of a plurality of aligned slot portions 51, 52, 53, and 54, with each slot portion being defined by an associated spaced pair of parallel edges having a particular precisely provided perpendicular distance therebetween. In particular, slot portion 51 is defined by edge portions 55, slot portion 52 is defined by edge portions 56, slot portion 53 is defined by edge portions 57, and slot portion 54 is defined by edge portions 58. The edge portions 55-58 are parallel to each other and parallel to a longitudinal axis through the stepped slot 47.

The edges of each slot portion are precisely formed and provided so that the perpendicular distance therebetween may be used for gaging purposes. Accordingly, slot portion 51 is provided with perpendicular distance 60 between its edges 55, while the edges 56 have a perpendicular distance 61 therebetween, the edges 57 have a perpendicular distance 62 therebetween, and the edges 58 have a perpendicular distance 63 therebetween. The perpendicular distance between each associated pair of parallel edges is less in each consecutive slot portion portion 51-54 disposed inwardly of edge 50 enabling the gage 43 to be moved in gaging relation with a holding bar and serve as what is popularly referred to as a go no-go gage for such holding bar. Accordingly, distance 63 is less than distance 62, which in turn is less than distance 61, which in turn is less than distance 60.

The gage 43 also has a measuring scale provided on the strip along at least one of the edges of the associated pair of edges of a slot portion and preferably a measuring scale is provided on both of the associated parallel edges of each slot portion. Thus, for the slot portion 51 a scale 65 is provided along each edge 55, for slot portion 52 a scale 66 is provided along each edge 56, for slot portion 53 a scale 67 is provided along each edge 57, and for slot portion 54 a scale 68 is provided along each edge 58. Each scale 65, 66, 67, and 68 is defined by suitable scale marks graduated to define whatever units are desired whether English units, metric units, or the like.

Figure 4:
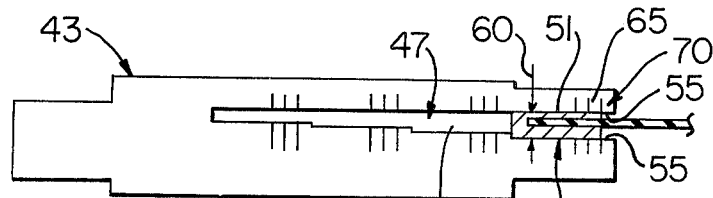
FIG. 4 is a view of the gage of this invention drawn to a reduced scale and illustrating the gage being used to measure the holding bar of FIG. 2.

In actual use the gage 43 is disposed so that a holding bar 26 being measured is positioned along the slot 47 and depending upon which slot portion the holding bar bottoms in, the thickness (within a range) of such holding bar is determined as well as its width. In this manner the gage 43 is used as a go no-go gage for the thickness of the holding bar. For example, in the illustration of FIG. 4, it will be seen that holding bar 26 may only be disposed in the slot portion 51 and cannot be moved into the slot portion 52 whereby the thickness of the holding bar being measured in FIG. 4 is roughly indicated by the distance 60 between edges 55 which is 0.250 inch. Similarly, in the illustration of FIG. 5, it will be seen that another holding bar is disposed relative to the gage 43 so that it is within the slot portion 53 whereby the thickness of such holding bar is measured by the distance 62 between edges 57 which is 0.1562 inch. Thus, it will be seen that the gage 43 is used as a go no-go thickness gage in that the thickness of the holding bar is determined by how far such bar can be disposed within the slot 47 of gage 43.

Figure 5:
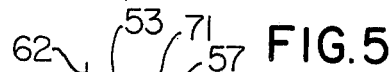
FIG. 5 is a view similar to FIG. 4 illustrating the gage of this invention being used to measure another holding bar.

It will also be appreciated that the width of each holding bar may be measured by the gage 43. For example, the width of the bar in FIG. 4 is read on the scale 65 at 70 while the width of the bar in FIG. 5 is read on the scale 67 at 71.

Figure 2:
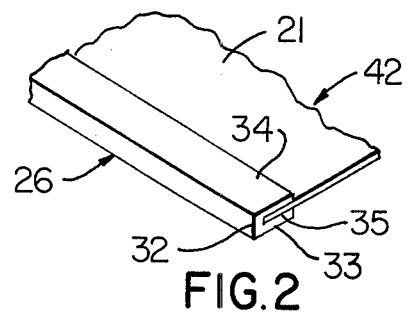
FIG. 2 is a fragmentary perspective view of an end portion of the assembly of FIG. 1 removed from the printing cylinder and illustrating the associated end portion of the blanket with a holding bar clamped therearound.
Figure 6:
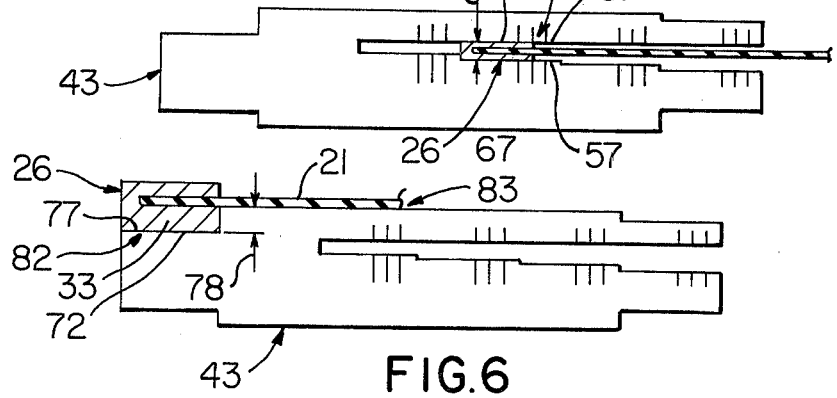
FIG. 6 is a view illustrating the gage of FIG. 4 being used to measure the thickness of a leg of an exemplary holding bar.

The gage 43 has at least one rectangular cutout in at least one corner of the strip 44 defining same and in this example of the invention, it will be seen that the strip 44 defining the gage 43 has a rectangular cutout in each of its four corners and in particular has a plurality of cutouts 72, 73, 74, and 75. Each rectangular cutout is particularly adapted to receive a leg of an associated holding bar disposed therewithin. Each cutout 72-75 is defined by an end edge 76 and a bottom edge 77. The end edge 76 of cutout 72 has a precise known height or dimension 78 which serves as a comparator gage for a leg of an associated holding bar brought into gaging association therewith. The cutouts 73, 74, and 75 have similar precise known heights 79, 80, and 81 respectively and such heights serve as comparator gages or scales (as indicated above) for determining the thickness of each leg of an associated holding bar. The known heights 78, 79, 80, and 81 in this example are 0.2500 inch, 0.625 inch, 0.1875 inch, and 0.1250 inch respectively. Thus, it will be seen that the comparatively thick leg 33 of the holding bar 26 illustrated in FIG. 2 may be measured in the cutout 72 as shown in FIG. 6, for example, to indicate that it has the thickness 78 because such leg may be nested within the slot 72 so that the bottom surface of the leg 33 is flush with the bottom edge 77 of the strip 44 as indicated at 82 while the blanket 21 is flush with and against the portion of the gage 43 as indicated at 83 without daylight or a space therebetween or without causing a bowing of the portion of the blanket adjoining the holding bar 26. It will be appreciated, for example, that if the leg portion 33 were to be brought into gaging association with the cutouts 73, 74, or 75, there would be a space between the blanket and the outer edge of the gage 43 comprising the elongated dimension thereof.

Thus, it is seen that the gage 43 is readily brought into gaging association to measure the thickness of each leg of a holding bar by determining which slot would most snugly receive a particular leg therewithin in nested relation whereby the cutouts 72-75 also serve as go no-go gaging means.

The various scales 65, 66, 67, and 68 comprising gage 43 may be defined by suitable marks integrally formed (as by embedding or scoring marks) in the material used to define the gage 43. Further, it will be appreciated that suitable separate scale members may be fixed to the strip 44 to define scales 65-68.

The gage 43 may be made of any suitable metallic or non-metallic material and may be made essentially of expendable material such as inexpensive metal, plastic, cardboard, or the like, whereby such gage 43 may be discarded after substantial wear thereof.

In addition, it will be appreciated that the gage 43 of this invention lends itself to simple and economical manufacture and is of such simplicity and economy that it may be used to provide advertising thereon and used as a giveaway item to promote a manufacturer's products.

It will also be appreciated that instead of each gaging height indicated, the gage itself may indicate a holding bar manufacturer's part number that would have a similar dimension or provide a code on the gage which may be referred to in a manufacturer's pamphlet or brochure to enable the holding bar user to refer to a particular off-the-shelf holding bar part number. Accordingly, the gage 43 may serve as a gage and advertising instrument.

The gage 43 of this invention may be used to determine the thickness of each leg of a U-shaped holding bar essentially as shown in FIG. 6. Further, a scale along slot 47 (such as a scale 65) may be used to measure the thickness of the blanket 21.

While present exemplary embodiments of this invention, and methods of practicing the same, have been illustrated and described, it will be recognized that this invention may be otherwise variously embodied and practiced within the scope of the following claims.

What is claimed is:

1. A printing blanket holding bar gage comprising a flat strip having a stepped slot defined therein from one edge thereof for receipt of a holding bar, and a rectangular cutout in at least one corner of said strip, said cutout being particularly adapted to receive a leg of an associated holding bar disposed therewithin, said slot being comprised of a plurality of aligned slot portions each defined by an associated spaced pair of parallel edges having a particular perpendicular distance therebetween with the perpendicular distance between each associated spaced pair of parallel edges being less in each consecutive slot portion disposed inwardly from said edge enabling said edge to be moved into gaging relation with a holding bar and serve as a go no-go gage therefore, and said cutout being defined by an end edge and a bottom edge wherein said end edge has a precise known height which serves as a comparator gage for a leg of an associated holding bar brought into gaging association therewith, said gage further comprising measuring scales provided on said strip along at least one of the edges of each associated spaced pair of edges, each of said scales beginning at one end of each of said slot portions for measuring the width of an immediately adjacent portion of an associated holding bar disposed in said slot portion.

2. A gage as set forth in claim 1 in which said strip is made of an expandable material and indicates thereon a manufacturers part number corresponding to a particular perpendicular distance between an associated spaced pair of parallel edges.

3. A gage as set forth in claim 1 in which each of said scales is provided on said strip as an integral part thereof.

4. A gage as set forth in claim 1 and further comprising a measuring scale provided on said strip along both edges of each associated pair of edges, each scale being adapted to measure the width of a portion of an immediately adjacent portion of an associated holding bar disposed in an associated slot portion, each scale being provided as an integral part of said strip.

5. A gage as set forth in claim 4 in which each of said scales is defined by scale marks imbedded in material defining said strip.

6. A gage as set forth in claim 1 in which said strip is a rectangular strip having a thickness which is a small fractional part of the width.

7. A gage as set forth in claim 6 in which said strip is an elongate strip and said slot is an elongate stepped slot disposed in said strip along its elongate dimension.

8. A gage as set forth in claim 7 and further comprising a rectangular cutout in each corner of said strip, each of said cutouts being defined by an end edge and a bottom edge wherein each end edge has a known height and said end edges are of different heights, said end edges serving as comparators for determining the thickness of each leg of an associated holding bar brought into gaging association therewith.

* * * * *

UNITED STATES PATENT OFFICE
CERTIFICATE OF CORRECTION

Patent No. 4,090,302        Dated May 23, 1978

Inventor(s) Jacob A. Bollmer

It is certified that error appears in the above-identified patent and that said Letters Patent are hereby corrected as shown below:

Column 5, line 43, "edge" (second occurrence) should be -- gage -- .

Signed and Sealed this

Third Day of October 1978

[SEAL]

Attest:

RUTH C. MASON
*Attesting Officer*

DONALD W. BANNER
*Commissioner of Patents and Trademarks*